United States Patent
Ruiz Quevedo

(10) Patent No.: US 11,787,948 B2
(45) Date of Patent: Oct. 17, 2023

(54) OPTICAL EFFECT PIGMENT

(71) Applicant: SICPA HOLDING SA, Prilly (CH)

(72) Inventor: Andrés Ruiz Quevedo, Madrid (ES)

(*) Notice: Subject to any disclaimer, the term of this patent is extended or adjusted under 35 U.S.C. 154(b) by 462 days.

(21) Appl. No.: 16/627,719

(22) PCT Filed: Jun. 21, 2018

(86) PCT No.: PCT/ES2018/070437
§ 371 (c)(1),
(2) Date: Dec. 30, 2019

(87) PCT Pub. No.: WO2019/002645
PCT Pub. Date: Jan. 3, 2019

(65) Prior Publication Data
US 2020/0354578 A1  Nov. 12, 2020

(30) Foreign Application Priority Data

Jun. 28, 2017 (EP) .................................. 17382410

(51) Int. Cl.
*C09C 1/00* (2006.01)
*C09D 11/322* (2014.01)

(52) U.S. Cl.
CPC .......... *C09C 1/0015* (2013.01); *C09D 11/322* (2013.01); *C01P 2006/42* (2013.01);
(Continued)

(58) Field of Classification Search
CPC ............. C01P 2006/42; C01P 2006/60; C09C 1/0015; C09C 2200/1054; C09C 2200/24;
(Continued)

(56) References Cited

U.S. PATENT DOCUMENTS

| 3,087,828 A | 4/1963 | Howard |
| 6,572,784 B1 * | 6/2003 | Coombs ................. B82Y 10/00 427/218 |

(Continued)

FOREIGN PATENT DOCUMENTS

| CN | 105452392 A | 3/2000 |
| CN | 1440446 A | 9/2003 |

(Continued)

OTHER PUBLICATIONS

Graham, et al. Introduction to magnetic materials. New Jersey: Wiley, 2009. p. 234-238.

(Continued)

*Primary Examiner* — Shuangyi Abu Ali
(74) *Attorney, Agent, or Firm* — Allen, Dyer, Doppelt & Gilchrist, P.A.

(57) ABSTRACT

Optical effect pigment comprising a plurality of layers and a magnetic element, the layers can be arranged in two stacks of asymmetric layers or in a single stack of layers and comprise at least an absorber layer and at least a dielectric layer and can further comprise a reflector layer. The magnetic element presents a magnetisation which is out-of-plane, i.e. predominantly perpendicular to the plane of the pigment, which allows a deposition on the printing substrate whereby the face of the pigment lying up or down on the substrate can be predetermined. Such effect pigment has applications in many fields and specifically in security printing, where due to controlled deposition for instance a double-stack pigment will produce a different optical effect on each of its faces.

17 Claims, 8 Drawing Sheets

(52) U.S. Cl.
CPC .. *C01P 2006/60* (2013.01); *C09C 2200/1054* (2013.01); *C09C 2200/24* (2013.01); *C09C 2210/50* (2013.01)

(58) Field of Classification Search
CPC . C09C 2210/50; C09D 11/107; C09D 11/322; C09D 11/324
See application file for complete search history.

(56) References Cited

U.S. PATENT DOCUMENTS

| | | | |
|---|---|---|---|
| 7,047,883 | B2 | 5/2006 | Raksha et al. |
| 7,955,695 | B2 | 6/2011 | Argoitia |
| 2002/0160194 | A1 | 10/2002 | Phillips et al. |
| 2003/0165637 | A1 | 9/2003 | Phillips et al. |
| 2003/0207113 | A1 | 11/2003 | Coulter et al. |
| 2005/0106367 | A1 | 5/2005 | Raksha et al. |
| 2006/0097515 | A1 | 5/2006 | Raksha et al. |
| 2008/0143016 | A1 | 6/2008 | Yu |
| 2009/0072185 | A1 | 3/2009 | Raksha et al. |
| 2014/0292355 | A1 | 10/2014 | Kenning |
| 2016/0176223 | A1 | 6/2016 | Degott et al. |
| 2018/0111406 | A1 | 4/2018 | Loginov et al. |

FOREIGN PATENT DOCUMENTS

| | | |
|---|---|---|
| CN | 107185788 A | 9/2017 |
| CN | 107710075 A | 2/2018 |
| EP | 1760118 | 3/2007 |
| EP | 1988555 | 11/2008 |
| JP | 7331109 | 12/1995 |
| JP | 2005509691 | 4/2005 |
| RU | 2333230 | 9/2008 |
| RU | 2472627 | 1/2013 |
| WO | 02040599 | 5/2002 |
| WO | 02073250 | 9/2002 |
| WO | 2004072186 | 8/2004 |
| WO | 2009074284 | 6/2009 |

OTHER PUBLICATIONS

Iwasaki, et al. Co—Cr recording films with perpendicular magnetic anisotropy. IEEE Transactions On Magnetics. Sep. 1978, vol. MAG-14, No. 5, p. 849-851.

Kraus, et al. Synthesis and magnetic properties of Ni—Al2o3 thin films. J. appl. phys. 1997, No. 82, p. 1189-1195.

Yamada, et al. Magnetic properties of electron beam evaporated CoPt alloy thin films. IEEE Transactions On Magnetics. Sep. 1997, vol. 33, No. 5, p. 3622-3624.

International Search Report and Written Opinion issued with respect to application No. PCT/ES2018/070437.

Alberto Argoitia et al.: "The concept of printable holograms through the alignment of diffractive pigments", Advances in Resist Technology and Processing XVI, vol. 5310, Jun. 3, 2004, pp. 275-288, US, ISSN: 0277-786X, DOI: 10.1117/12.531243, ISBN: 978-1-5106-3857-0.

European Office Action (Communication pursuant to Article 94(3) EPC) in counterpart European Application No. 17382410.3 dated Sep. 17, 2020.

Office Action issued in counterpart Russian Application No. 2020100595 dated Sep. 8, 2021 (and English language translation of the Office Action), 10 pages.

Office Action issued in counterpart Chinese Application No. 201880043524.5 dated Nov. 16, 2020 (and English language translation of the Office Action).

Notice of Reasons for Rejection issued in corresponding Japanese Application No. P2019-564168 dated Mar. 29, 2022 (and English language translation of the Notice of Reasons for Rejection).

* cited by examiner

OPTICAL EFFECT PIGMENT

TECHNICAL FIELD

The invention pertains to the field of optical effect pigments used for different purposes including security printing, particularly to effect pigments comprising a plurality of layers and a magnetic element.

BACKGROUND ART

An optical effect pigment, also called "Optically Variable Pigment" (OVP) among other names, is a particle presenting the following basic features: a) It has an elongated flake, plate or platelet shape and therefore it has two faces, b) its structure is made up of a number of layers and c) it renders an optical effect which depends mostly on the number, composition, thickness and index of refraction of its layers. Optical effects comprise colour-changing effects, holographic effects and luminescent effects. The name "optical effect pigment", "effect pigment" or simply "pigment" shall be used throughout this patent.

Effect pigments have many industrial applications, especially in the cosmetic, coatings and security printing domains. Pigments can be dispersed in a liquid medium, such as a carrier or varnish, typically composed of monomers or polymers and photo-iniciators. When exposed to UV light or other stimuli, said components reticulate, conforming a transparent solid matrix that holds the pigment in a fixed position on the substrate. Effect pigments according to the present invention may be used in any of those fields, but particularly in security printing.

Security printing is concerned with the printing of items such as banknotes, cheques, passports, identity cards and other valuable documents. A variety of anti-counterfeiting techniques are used in this field, one of them being colour changing inks, also called Optically Variable Inks (OVI). A document, or more commonly, a part of a document, printed with this ink will appear to change its colour depending on the angle the document is viewed at, i.e. depending of the angle of incidence of light to the surface of the document. This angle-dependent colour appearance cannot be reproduced by colour copying equipment, thus making it a very effective and widely used printing technique, especially in screen-printing or intaglio printing. The different colour appearance effect is attained by using a printing ink made up of a carrier with effect pigments dispersed in it.

U.S. Pat. No. 3,087,828 A (HOWARD R. LINTON) 28 Jun. 1961 "Nacreous pigment composition", teaches a basic effect pigment structure with a micaceous substrate, which is the reflective core of the pigment, and a translucent layer. More common nowadays are pigments with a "dielectric/metal/dielectric" layer structure, although there are more complex structures. The optical variability of these pigments is due to an interference effect, whereby the light falling upon a pigment is partially reflected and partially transmitted or diffracted. The partially transmitted or diffracted portion reaches the reflector layer of the pigment and is reflected back, interfering constructively or destructively with the other portion depending on factors such as the wavelength of the incident light, the thickness of the layers and the incidence angle.

As it has been said, effect pigments have not only been used in the domain of security printing, but also in the manufacturing of commercial coating compositions based on coated aluminum flakes (for instance, automotive paints) or in cosmetic preparations such as nail varnish. Although of a lesser quality in terms of brightness and colour shifting, the cheap availability of these coatings has weakened the security potential of effect pigments, since a document may be reproduced by a high-quality colour printer or scanner and its optically variable portion can be added using a commercially available effect pigment.

This shortcoming has been addressed by designing effect magnetic pigments, that is to say, effect pigments one of whose layers has magnetic properties (i.e. either the layer is magnetic or magnetisable). The magnetic layer functions primarily as a covert security feature, since magnetism can be detected by a sensor in order to authenticate the document. WO 02/073250 A (SICPA HOLDING S.A.) 19 Sep. 2002 [0017], [0023], FIG. 2 discloses a magnetic pigment with a symmetric seven-layer structure "absorber/dielectric/reflector/magnetic/reflector/dielectric/absorber".

Another advantage of magnetic effect pigments is that they make it possible to control, to a certain extent, the spatial orientation of the pigments during the printing or drying process. This is important because the pigments' orientation on the substrate will determine their optical effect. Typically, this is performed by submitting the magnetic pigments to an external magnetic field generated by a set of magnets or electro magnets located by the printing or drying machines. Given that the magnetic pigments are dispersed in a liquid medium, they are free to move and therefore will react to such external magnetic field. When the liquid medium evaporates during the printing or drying process, the pigments will be fixed to the substrate, no longer influenced by any external magnetic field.

According to a basic principle of Physics, a magnetic or magnetisable material will always align its magnetisation in parallel to an external magnetic field, such as for example a compass in respect to the Earth's magnetic field. Therefore, the alignment of the magnetisation of an effect magnetic pigment with respect to the magnetic field generated by the printing machine, which takes place when the magnetic pigment is dispersed in a liquid medium, will always be parallel to such magnetic field. A related question is how the pigment will orientate itself in space with respect to an external magnetic field. That question depends on another factor, namely the magnetisation of the magnetic or magnetisable element of the pigment. It is known that a thin magnetic or magnetisable layer forming part of an elongated particle, such as the magnetic layer of prior-art magnetic effect pigments, presents a parallel magnetisation, also called in-plane magnetisation. Parallel or in-plane magnetisation means that the magnetisation of the magnetic or magnetisable layer of the pigment is parallel to the plane of said layer (since said layer is an integral part of the pigment, for easy of reference "magnetisation of the pigment" will mean hereinafter "magnetisation of the magnetic or magnetisable layer of the pigment". Likewise, it will be said that such magnetisation is parallel or out-of-plane with respect to "the plane of the pigment" or simply "to the plane" although it will be easily understood that, rectius, it is parallel to the plane of the magnetic or magnetisable layer of the pigment). Under the effect of said in-plane magnetisation, known pigments incorporating such magnetic or magnetisable layer will spatially orientate themselves with respect to an external magnetic field in a position that will be parallel to such magnetic field. The parallel magnetisation occurs because the easy axis of the magnetic or magnetisable layer (i.e. the direction of the preferential magnetisation of the layer's material) is contained in the plane of the layer.

The above implies that the orientation of the pigments on the printing substrate can be controlled by way of magnetic fields generated by the magnets in the printing machine and whilst the pigments are dispersed in a liquid medium, because the pigments will necessarily orientate themselves spatially in parallel to said magnetic fields. Therefore, by changing the direction of the magnetic fields as desired, the spatial orientation of the pigments will change.

However, another aspect of the position that a prior art magnetic effect pigment will have on the printed substrate cannot be controlled by way of magnetic fields, namely, which face of the pigment will fall "face down" on the substrate and which one "face up". The mentioned parallel magnetisation of pigments with respect to the plane does not have an influence on this aspect. A magnetic pigment in a liquid medium, due to its parallel magnetisation, will be restrained in a parallel position with respect to the magnetic field, but will rotate freely around that magnetic field direction. As the magnetisation is parallel to the plane of the pigment, this free rotation around the magnetic field direction implies a "face up—face down" motion, as a result of which the pigment is liable to fall on the substrate on either face at random. This means that the face which will be visible on the substrate cannot be predetermined, and therefore the magnetic pigment must be designed with a symmetric layer structure, to ensure that, whatever face will lie face up on the substrate, the optical effect will be the same, because the two faces are identical. For instance, the pigment disclosed at above-mentioned document WO 02/073250A has a symmetric structure "in order to provide for equal properties on both sides" [0017]. In another embodiment disclosed in same document, FIG. 3, [0018] the magnetic layer is adjacent to only one reflector layer, resulting in a magnetic structure with optical properties along solely one reflector layer side. However, it must be noted that this embodiment does not refer to a pigment, but to a foil to be applied in a controlled way, as it is clear from [0024]: "The device is subsequently applied to a substrate with the magnetic layer facing the substrate [in a controlled way, with the reflector side with optical properties facing upwards], by e.g. using an appropriate glue".

In other state-of-the-art documents concerned with effect pigments, references are as well to the pigments aligning in parallel to the magnetic field, for example, US 20090072185 A (VIAVI SOLUTIONS INC.) 19 Mar. 2009, abstract; describes magnetic flakes in a liquid carrier under influence of an external magnetic field, where the flakes attract one another side-by-side and form ribbons which provide higher reflectivity to a coating. The magnetisation of the pigments is an "in plane magnetic anisotropy" [0009]. U.S. Pat. No. 7,047,883 B (VIAVI SOLUTIONS INC.) 23 May 2006 refers to an apparatus and related methods to align magnetic flakes in a carrier. As shown in FIG. 5C, orientation of the magnetic flakes is parallel to the lines of the magnetic field. U.S. Pat. No. 7,955,695 B (VIAVI SOLUTIONS INC.) 7 Jun. 2011 relates to an Optic Effect Layer (OEL) with so-called grated magnetic or magnetisable pigment particles, where drawings, for instance FIGS. 4, 6 and 8, show that pigments are oriented in space in parallel to the magnetic fields.

Against this background, the effect pigment proposed in this patent has a magnetic or magnetisable element whose magnetisation with respect to the plane of the pigment is out-of-plane, a feature which makes it possible to predetermine which face of the pigment will lie "face up" and which one "face down" on the substrate. This offers important advantages in the manufacturing and performance of effect pigments.

SUMMARY OF INVENTION

The present invention refers to an effect pigment comprising a plurality of layers and a magnetic element. The "magnetic element" as referred to in this patent might be any of the pigment components presenting magnetic properties, for instance one or more magnetic layers. "Magnetic properties" means either that the magnetic element is magnetized or that it is magnetisable, in either case along a magnetic easy axis. In this invention, the effect pigment characterizes itself in that its magnetic element has an out-of-plane magnetisation, i.e. in that its easy magnetic axis is predominantly perpendicular to the plane of the pigment. "Predominantly perpendicular" means that the easy magnetic axis defines an angle preferably between 45° and 135°, more preferably between 60° and 120° and more preferably between 80° and 100° with a line which is horizontal to the plane of the pigment.

FIG. 1 contains a schematic representation of a prior art effect magnetic pigment (1) with a conventional in-plane magnetisation. The pigment is dispersed in a carrier, forming a printing ink. It is subjected to a horizontal magnetic field (2). The pigment (1) has a multi-layer structure with a first stack of layers (3), a second stack of layers (4) (individual layers making up the stack are not shown) and a magnetic layer (5). The layers of the respective stacks are symmetric, in that they have the same disposition, composition, thickness and refractive index. The pigment (1) is revolving around the magnetic field (2). The drawing represents a sequence of three stages in the rotation. In a first stage (A), the first stack of layers (3) is facing upwards, in a second stage (B) the pigment (1) is in the middle of a rotation and in a third stage (C) the pigment (1) has completed the rotation, so the second stack of layers (4), which at (A) was facing downwards, is now facing upwards, and so on and so forth. As a result of this free rotation around the magnetic field, when the carrier is applied to the substrate, the pigment (1) may at random fall on its first (3) or second (4) stack of layers. Hence that, to ensure that all the pigments on the viewing side produce the same optical effect, double-stack pigments with in-plane magnetisation must have a symmetrical layer structure, because this makes it irrelevant on which side the pigments rest on the substrate.

The above-described behaviour of an effect magnetic pigment with a conventional in-plane magnetisation does not depend on the direction of the magnetic field. The same free rotation would take place if a pigment with in-plane magnetisation were subjected to a magnetic field with different direction, such as a vertical, curved or radial magnetic field. Its magnetisation with respect to the plane being parallel, the pigment would necessarily be in a spatial orientation parallel to the direction of the magnetic field, whatever the direction of the magnetic field. A different magnetic field would change the spatial orientation of the pigment with respect to the substrate, but at all events the described "face up—face down movement" revolving around the magnetic field, with random falling positions, would still occur. To illustrate this, FIG. 2 shows the same schematic representation of same prior art pigment as in FIG. 1, this time under the effect of a vertical magnetic field, where it will be appreciated that the pigment (1) has changed its spatial orientation with respect to the pigment in FIG. 1, but is still subjected to identical "face up—face down" rotation around the vertical magnetic field.

FIG. 3 contains a schematic representation of a pigment (6) according to this invention. The pigment (6) is under a horizontal magnetic field (7) at three different stages of its rotation (A, B, C) around the magnetic field (7). Said pigment (6) presents an out-of-plane magnetisation, on account of which and as opposed to pigments in FIGS. 1 and 2, the pigment (6) is spatially oriented in a predominantly perpendicular position with respect to the magnetic field (7). The pigment (6) rotates around the magnetic field, but due to said orientation, the rotation is from left to right and the pigment does not flip, meaning that one stack of layers (8) is constantly looking up and the other (9) is constantly looking down, regardless of the stage of the rotation (A, B, C). When the carrier is applied to the substrate, all the pigments (6) will lie on the same stack of layers (in the example, on the second stack of layers (9), with the first stack of layers (8) facing up). Again, nothing would change if the perpendicularly magnetized pigments were subjected to a magnetic field with different direction, as FIG. 4 illustrates with reference to a vertical magnetic field.

Finally, to illustrate the behaviour of effect pigments with conventional in-plane magnetisation, a prior-art example is given at FIG. 5 where a number of pigments (10) are dispersed in a liquid carrier over a substrate (11) and submitted to a curved magnetic field (12). The pigments have a first (13) and a second (14) stacks of layers and a magnetic layer (15) in between. An arrow (16) parallel to the plane of the pigments (10) indicates that their magnetisation is parallel to their plane. Three phenomena can be observed: first, the alignment of magnetisation of the pigments (10), as of any other pigment or any other magnetic or magnetisable element is, as a matter of principle, always in parallel with respect to the direction of the magnetic field (12), as represented by the arrow (16) which is parallel to the magnetic field (12). Second, regarding the spatial orientation of the pigments (10) in respect of the direction of the magnetic field (12), since, with respect to the plane, the pigments (10) have an in-plane magnetisation, the pigments (10) orientate themselves in parallel to the magnetic field (12). And third, due to the free rotation "face up—face down" around the magnetic field (12), resulting from said in-plane magnetisation with respect to their plane, some pigments (10) will fall on the substrate with the first stack of layers (13) facing upwards and some with the second stack of layers (14) facing upwards, an aspect which happens at random and cannot be controlled.

According to a first preferred embodiment of the invention, the effect pigment comprises a plurality of layers arranged in two stacks of layers and it also comprises a magnetic element. The magnetic element comprises a magnetic or magnetisable layer, located between the two stacks of layers, its magnetisation with respect to the plane of the pigment being out-of-plane. The two stacks of layers have an asymmetric structure, in the sense that either the respective stacks comprise a different number of layers, or the layers of the respective stacks are made of different materials or vary in their thickness or index of refraction. In this patent, the asymmetry feature implies that said two asymmetric stacks of layers produce a double optical effect, i.e. the optical effect produced by one stack of layers differs from the optical effect produced by the other.

This double-optical-effect pigments present the key advantage that two distinct optical effects can be obtained with one pigment, as opposed to existing double stack pigments with in-plane magnetisation in respect of the plane, which must keep symmetry in their layers and therefore will produce just one and the same optical effect on both layers. The double optical effect can be rendered in practice because, due to the perpendicular magnetisation of the pigment with respect to their plane, the deposition of the pigments on the substrate can be controlled.

The claimed pigment has applications in different fields, particularly in security printing. One of its uses in this field, specifically with regard to the first embodiment with two asymmetric stacks of layers, is in relation to security features destined to be viewed from both sides of the marked document, for instance where the printing substrate is transparent, such as a polymer. In this case, a security feature printed on the substrate will produce one optical effect on one side of the substrate and a different one on the reverse side. This effect is not possible with existing in-plane-magnetized pigments, because due to the unpredictability of falling positions on the substrate, both sides would have to be symmetrical and therefore would render the same optical effect on both sides of the transparent substrate, which would be useless as a security feature.

FIG. 6 exemplifies the above-mentioned advantageous application of the claimed effect pigments in said first preferred embodiment. A number of out-of-plane-magnetized pigments (16), with first (17) and second (18) stacks of layers and a magnetic layer (19) and submitted to a radial magnetic field (20) are dispersed on a liquid carrier over a transparent substrate (21). First and second stacks (17, 18) are asymmetrical. An arrow (22) in the pigments (16), which is perpendicular with respect to the plane of the pigments, indicates that the magnetisation of the pigments (16) is predominantly perpendicular with respect to the plane. But it must be kept in mind that, according to the above-mentioned basic principle of Physics, the alignment of the magnetisation of the pigment with respect to the magnetic field is always in parallel to such magnetic field, hence that the arrows indicating the radial magnetic field (20) and the arrows (22) in the pigments (16) are parallel to each other. As can be seen, said alignment of the magnetisation of the pigments (16) with respect to the magnetic field (20) necessarily causes a spatial orientation of the pigments (16) which is predominantly perpendicular to the magnetic field (20), due to the claimed pigments' out-of-plane magnetisation with respect to the plane. This behaviour is different from that observed in FIG. 5, where the spatial orientation of pigments (10) with respect to the magnetic field (12) was parallel, due to their conventional in-plane magnetisation.

As already explained with respect to FIGS. 3 and 4 and can be appreciated in FIG. 6, all the pigments (16) present the same side up, because according to their out-of-plane magnetisation, their free rotation around the magnetic field (20) is from left to right and the pigments (16) do not flip. Since in this embodiment the stacks of layers (17, 18) are asymmetric, the optical effect produced by the first stack of layers (17) will be different to the optical effect produced by the second stack of layers (18). Since the substrate (21) is transparent, when viewed from above the optical effect will be different from the optical effect produced when viewed from its reverse side. Besides, as in this example the magnetic field is radial (20), there will be a so-called "rolling-bar effect", whereby the observer will see a specular reflection zone which moves away or towards him as the image is tilted. This is a known security printing effect, basically described in US 2005/0106367 A (VIAVI SOLUTIONS INC.) 19 May 2005 and based on the orientation of pigment particles imitating a curved surface across the coating. The use on a transparent substrate of claimed double-stack, asymmetric and out-of-plane-magnetized pigments achieves a double-sided rolling-bar effect, as opposed to the known single-sided effect which is due to the limitation of having to use symmetric pigments.

Claimed pigments in this first preferred embodiment offer an alternative to holographic foils or patches whose appearance changes when the marked document is rotated, generally known as diffractive optically variable image devices (DOVIDs). This can be exemplified by FIG. 7 which shows a number of magnetized pigments (23) with an out-of-plane magnetisation, as indicated by the arrow (24), dispersed on a liquid carrier over a substrate (25) and submitted to a slightly curved magnetic field (26). The alignment of the magnetisation of pigments (23) is forcefully in parallel with respect to the magnetic field (26), which as has been explained necessarily causes that the out-of-plane-magnetised pigments (23) orientate themselves in space perpendicularly to the magnetic field (26). Due to the predictability in the deposition of the claimed pigments with out-of-plane magnetisation, their stacks of layers do not have to be symmetrical. Thus, in the example the pigments are built with asymmetric stacks of layers (27, 28) and therefore the marked document will present two optical effects on the same side depending on the position of the viewer. The advantage of the present embodiment is that this sort of optical effect can be incorporated to a document by using printing techniques, for instance silkscreen or intaglio, instead of the known and more expensive process of hot-stamping a holographic device on the document.

By rearranging the direction of the magnetic field, further optical effects can be attained using double-stack, asymmetric and out-of-plane-magnetized pigments, for instance as shown in FIG. 8 with a radial magnetic field with inverted polarization. In this example, the pigments (29) dispersed on a liquid carrier will arrange themselves perpendicularly to a magnetic field with two polarizations (30.1, 30.2) and they will be deposited on the substrate with one or the other stack of layers facing up or down according to the polarization (30.1, 30.2) that affects them. However, all pigments affected by the same polarization will fall in the same way; therefore, two different optical effects will be produced in two distinct areas of the same substrate. Thanks to the use of perpendicularly magnetized pigment and the advantage of their controlled deposition on the substrate, to obtain this optical effect there is no need to print the same substrate twice with a different colour of ink each time, because a single printing ink with the pigments of this embodiment will procure the two distinct optical effects produced by their asymmetric stacks of layers.

In a variant of the first embodiment and as an additional security measure for a printed document, the effect pigment comprises a luminescent material which, when excited by an energy source, emits a response in the form of an electromagnetic wave. The luminescent material can be added preferably to the dielectric layers (35a, 35b) or it can be incorporated in the form of a luminescent layer added as a respective additional layer to each of the stacks of layers (31, 32). In either case, the luminescent material has different features on each layer, in order to obtain a different luminescent response on each side of the pigment, this being another example of a double response obtained with just one pigment.

According to a second preferred embodiment of the invention, the layers in the effect pigment are arranged in one stack of layers comprising an absorber layer, a dielectric layer and a reflector layer and the pigment also comprises a magnetic element consisting of at least one magnetic layer with an out-of-plane magnetisation.

As already mentioned, known security pigments with a parallel magnetisation with respect to their plane need two symmetrical stacks of layers in order to ensure that the desired optical effect is produced, whereas according to the first preferred embodiment of this invention, a double-stack magnetic effect pigment can produce two different optical effects. Now this second preferred embodiment has the advantage that a single-stack pigment with out-of-plane magnetisation renders the same optical effect that a symmetric double-stack pigment with in-plane magnetisation. The reason is evident from the preceding description: the perpendicular magnetisation can be used to ensure that all pigments will lie on the substrate with the magnetic element facing downwards to the substrate and the single stack of layers facing upwards to produce a the optical effect. Therefore, the additional stack of layers becomes unnecessary and can be disposed with, bringing substantial production costs savings.

According to a third preferred embodiment of the invention, the layers in the effect pigment are arranged in a single stack of layers comprising an absorber layer and a dielectric layer and not comprising a reflector layer. The pigment also comprises a magnetic element consisting of at least one magnetic layer with an out-of-plane magnetisation. Said magnetic element comprises nickel particles and Aluminum. The presence of Aluminum allows the magnetic element to function as well as a reflector layer. Therefore, this embodiment can save yet another layer in the structure of the effect pigment.

According to a fourth preferred embodiment, the layers in the effect pigment are arranged in two stacks of layers each one comprising an absorber layer and a dielectric layer and not comprising a reflector layer. The pigment also comprises a magnetic element consisting of at least one magnetic layer with an out-of-plane magnetisation. Said magnetic element comprises nickel particles and Aluminum. The presence of Aluminum allows the magnetic element to function as well as a reflector layer for both stacks of layers. Therefore, this embodiment allows a saving of two layers in the structure of a double-stack effect pigment.

The claimed effect pigments with an out-of-plane magnetisation, as opposed to the effect pigments with an in-plane magnetisation as known in the state of the art, are based on the general principle of Physics that the combination of two uniaxial magnetic anisotropies (of different physical origin) with easy axis in perpendicular directions produces a single uniaxial anisotropy whose easy axis lies in the direction of the stronger one, and whose magnitude is the difference between them, this effect being particularly relevant where the magnetic element is a thin layer. The claimed pigments are made with magnetic layers with an anisotropy constant Ku, which are given an appropriate geometry to create a shape anisotropy Ks in a direction perpendicular to Ku and weaker than it. The resulting anisotropy has an effective anisotropy Kef=Ku−Ks. This phenomena is explained in, among others, GRAHAM, et al. Introduction to magnetic materials. New Jersey: Wiley, 2009. p. 234-238.

DESCRIPTION OF EMBODIMENTS

Figure 1:
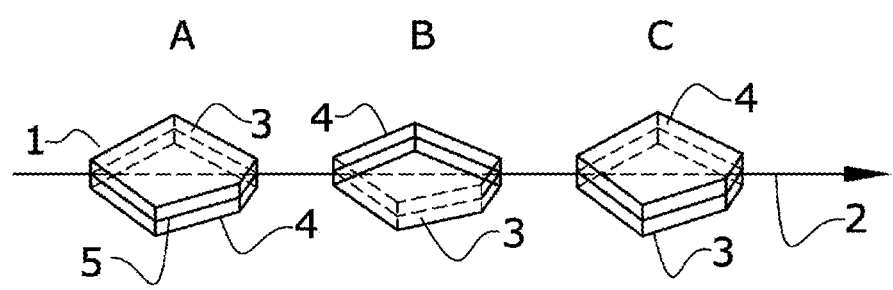
FIG. 1: Effect pigment with in-plane magnetisation in different stages of rotation around a horizontal magnetic field.
Figure 2:
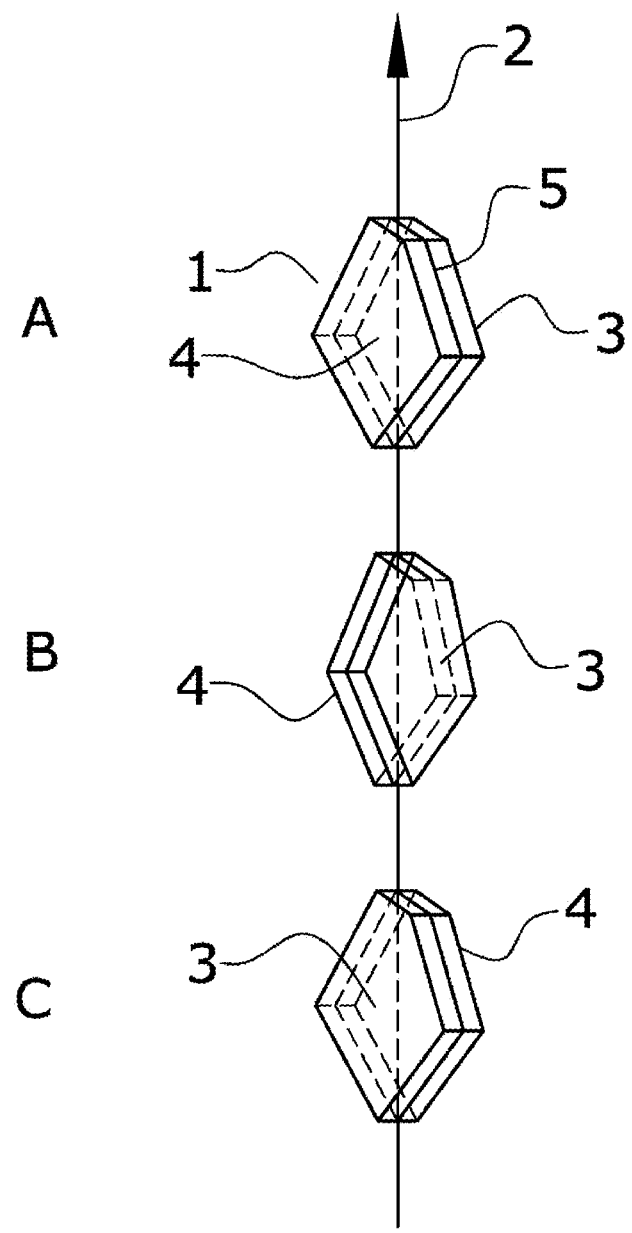
FIG. 2: Effect pigment with in-plane magnetisation in different stages of rotation around a vertical magnetic field.
Figure 3:
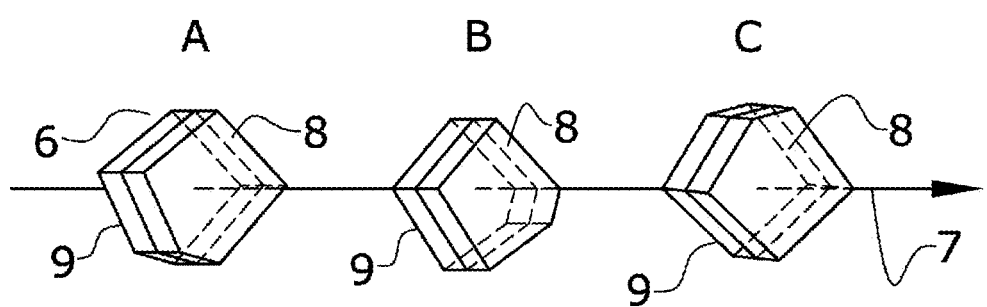
FIG. 3: Effect pigment with out-of-plane magnetisation in different stages of rotation around a horizontal magnetic field.
Figure 4:
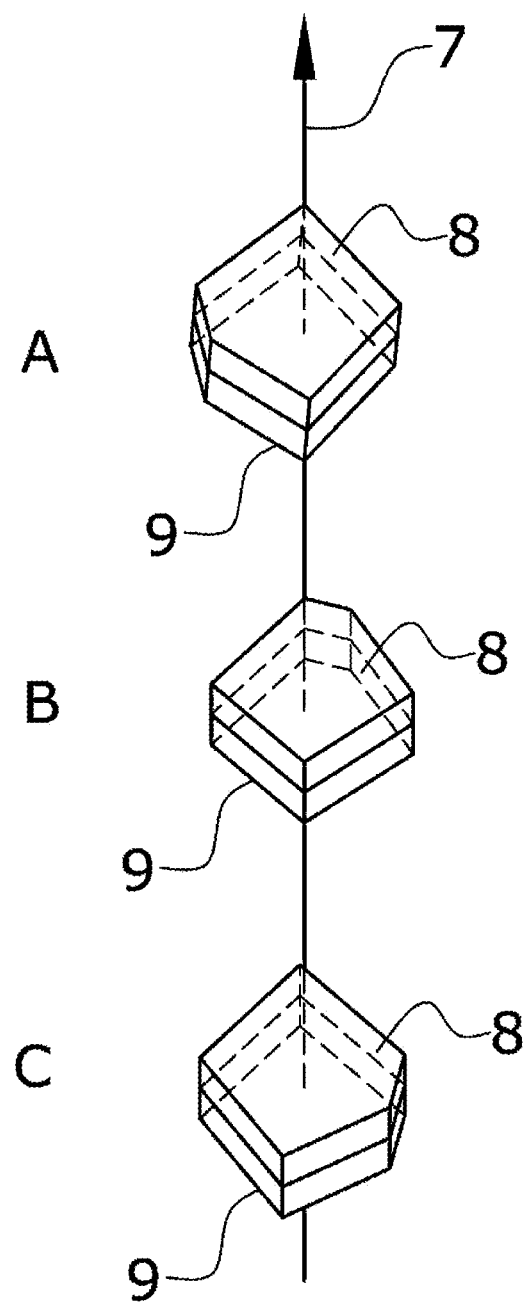
FIG. 4: Effect pigment with out-of-plane magnetisation in different stages of rotation around a vertical magnetic field.
Figure 5:
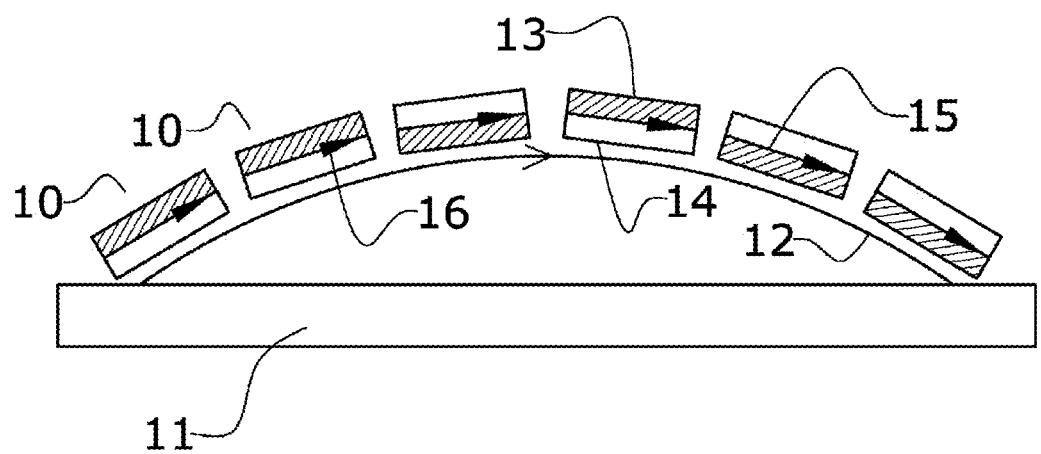
FIG. 5: Effect pigments with in-plane magnetisation over substrate under curved magnetic field.
Figure 6:
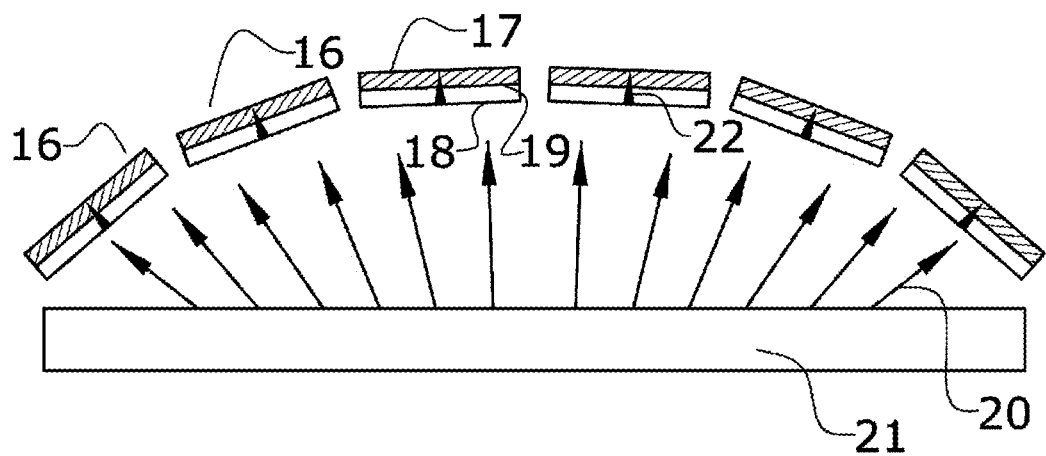
FIG. 6: Effect pigments with out-of-plane magnetisation over substrate under radial magnetic field.
Figure 7:
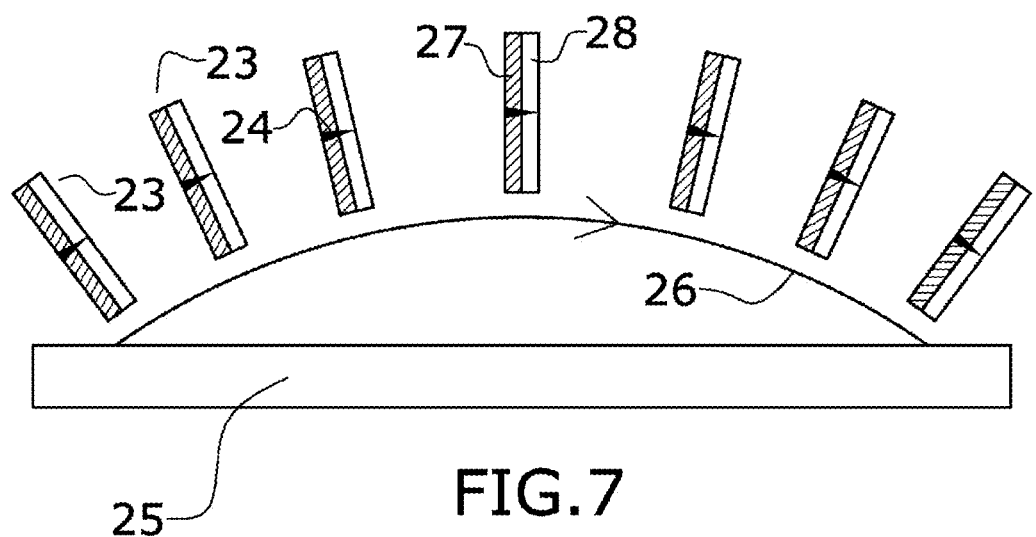
FIG. 7: Effect pigments with out-of-plane magnetisation over a substrate under a curved magnetic field.
Figure 8:
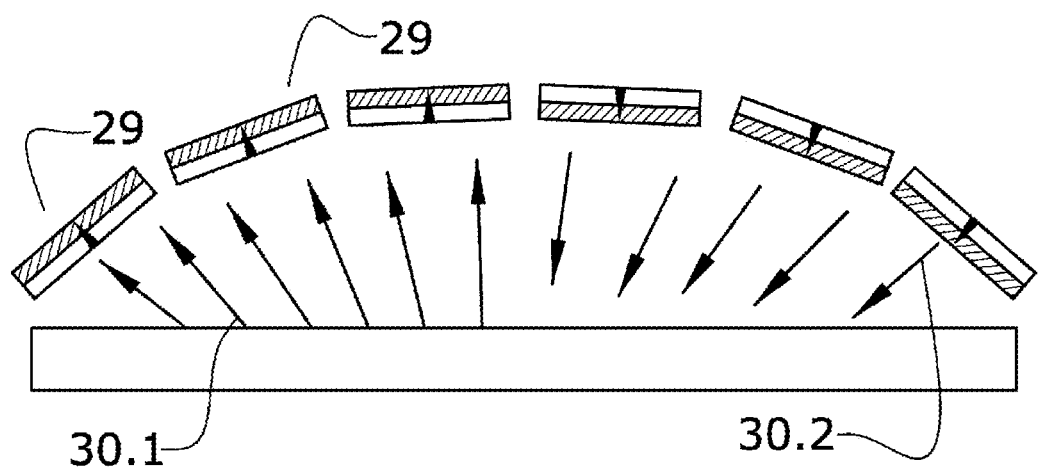
FIG. 8: Effect pigments with out-of-plane magnetisation over a substrate under a polarized magnetic field.
Figure 9:
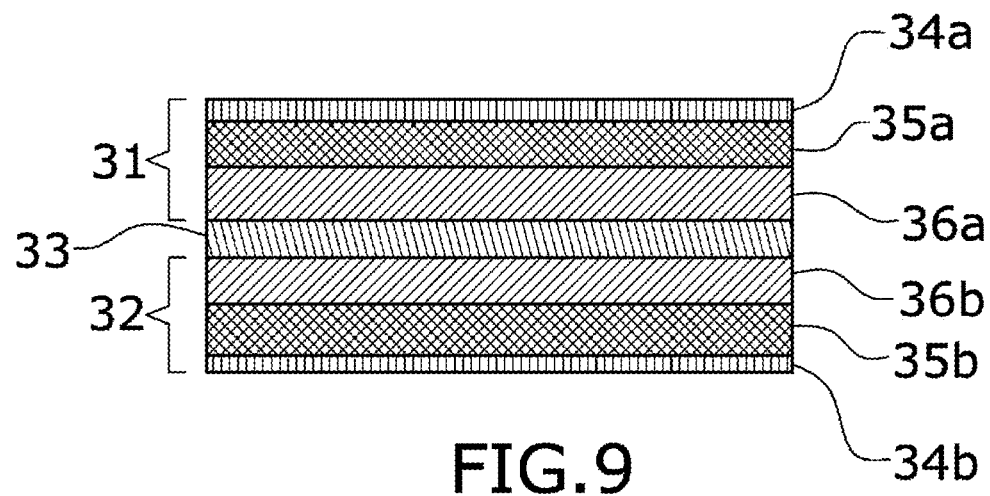
FIG. 9: Effect pigment according to a first embodiment of the invention.

With reference to FIG. 9, according to a first preferred embodiment, the effect pigment with magnetic element comprises a first (31) and a second (32) stacks of layers and a magnetic layer (33), said magnetic layer (33) located in between first (31) and second (32) stacks of layers and having an out-of-plane magnetisation with respect to the plane of the pigment.

The first stack of layers (31) comprises at least an absorber layer (34a), at least a dielectric layer (35a) and at least a reflector layer (36a). The second stack of layers (32) comprises at least a reflector layer (36b), at least a dielectric layer (35b) and at least an absorber layer (34b). The first stack of layers (31) has a different configuration than the second stack of layers (32), in that at least one of the layers (34a, 34b, 35a, 35b, 36a, 36b) is different from its counterpart, e.g. it is made of a different material or it has a different thickness or a different refractive index; or in that first (31) and second (32) stacks of layers have a different number of layers, producing in any event a double optical effect.

The absorber layers (34a, 34b) are made up of metallic absorbers, including chromium, aluminum, nickel, silver, copper, palladium, platinum, titanium, vanadium, cobalt, iron, tin, tungsten, molybdenum, rhodium and niobium, as well as their corresponding oxides, sulphides, and carbides. Other suitable absorber materials include carbon, graphite, silicon, germanium, cermet, ferric oxide or other metal oxides, metals mixed in a dielectric matrix, and other substances that are capable of acting as a nonselective or selective absorber in the visible spectrum. Various combinations, mixtures, compounds, or alloys of the above absorber materials, known to the skilled in the art, may be used to form the absorber layers. In this embodiment, the absorber layer preferably has a thickness of 2 to 40 nm, more preferably of 3 to 30 nm and yet more preferably of 3.5 to 15 nm, these ranges being adequate for all embodiments herein described.

The dielectric layers (35a, 35b) are made up of high refractive index materials, including zinc sulphide, zinc oxide, zirconium oxide ($ZrO_2$), titanium dioxide ($TiO_2$), diamond-like carbon, indium oxide ($In_2O_3$), indium-tin-oxide (ITO), tantalum pentoxide ($Ta_2O_5$), ceric oxide ($CeO_2$), yttrium oxide ($Y_2O_3$), europium oxide ($Eu_2O_3$), iron oxides such as (II)diiron(III) oxide ($Fe_3O_4$) and ferric oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon monoxide (SiO), selenium trioxide ($Se_2O_3$), tin oxide ($SnO_2$), tungsten trioxide ($WO_3$), and combinations of those materials. Also, said dielectric layers (35a, 35b) can be made up of low refractive index materials, including silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$, $Na_6Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), perfluoroalkenes, polytetrafluoroethylene (Teflon), fluorinated ethylene propylene (FEP) or combinations thereof. The thickness of the dielectric layer determines the effect pigment colour and is of the order of 200 to 800 nm.

The reflector layers (36a, 36b, 41) can be made up of a variety of reflective materials, including aluminum, silver, copper, gold, platinum, tin, titanium, palladium, nickel, cobalt, rhodium, niobium, chromium, iridium, and combinations or alloys thereof. Appropriate thickness is preferably from 10 to 2000 nm, more preferably from 20 to 1000 nm and yet more preferably from 50 to 100 nm, these ranges being adequate for first and second embodiments described.

It will be clear to the person skilled in the art that variations of materials and/or variations of thickness, all within the acceptable ranges described, with respect to the material or thickness of its counterpart layer; and variations of refractive index in one of the layers, or a variation in the number of layers in one of the stacks (31, 32), will entail an asymmetrical layer structure and therefore the optical effect produced by the two stacks of layers (31, 32) will be different.

With respect to the magnetic layer (33) with out-of-plane magnetisation, its composition is Cobalt-based, because due to this mineral crystal structure, it is highly suitable to make thin layers with a predominantly perpendicular easy axis. To increase the magneto crystalline anisotropy constants, cobalt is allied with Platinum or chromium. CoPt and CoCr monolayer and multilayer structures can be used, the monolayer structure being preferable. Stoichiometry of said alloys are: $Co_{75}Pt_{25}$ and $Co_{90}Cr_{10}$ because these proportions optimize the out-of-plane anisotropy of the layer. The thickness of the magnetic layer (33) is preferably from 20 to 1000 nm, more preferably from 30 to 150 nm and yet more preferably from 50 to 100 nm, these ranges being adequate for the first and second embodiments.

In a variant of the first embodiment, the effect pigment comprises a luminescent material which is added to the at least two dielectric layers (35a, 35b). Suitable luminescent materials are disclosed in WO 02/040599 A (FLEX PRODUCTS INC.) 23 May 2002. Addition of the luminescent material is made by the same deposition process that will be described hereinafter, by including the luminescent material together with the dielectric material in the target employed for the deposition. In a further variant, the luminescent material can be incorporated in the form of a luminescent layer added to each of the stacks of layers (31,32). Suitable materials for these layers are the same described in above-mentioned WO 02040599 A. The luminescent material is added according to the same process applicable to the other layers which will be referred hereinafter. The luminescent response may or may not be in the visible spectrum. In the latter case, the response must be detected using an appropriate sensor. A key feature of the invention is that the luminescent material incorporated to the respective stacks of layers (31, 32) is different, thereby the pigment will show a double optical effect in the form of a different luminescent response on each of its sides.

Figure 10:
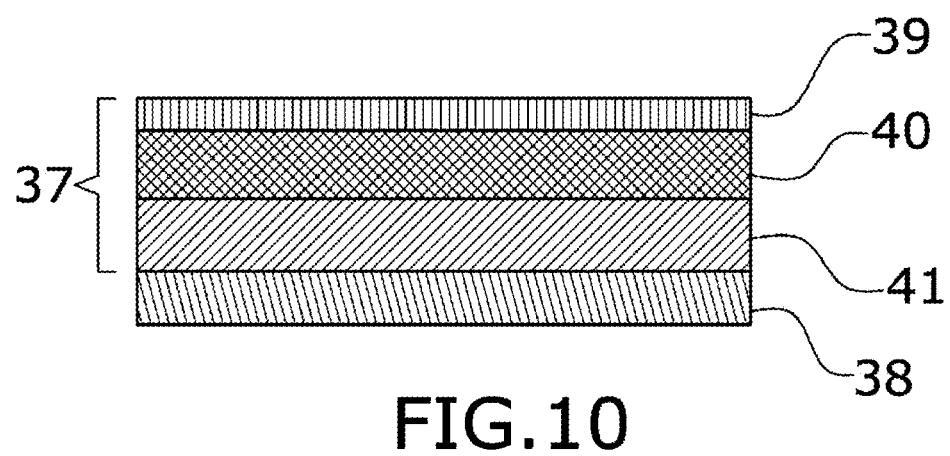
FIG. 10: Effect pigment according to a second embodiment of the invention.

With reference to FIG. 10, according to a second preferred embodiment, the effect pigment with magnetic element comprises a stack of layers (37) and a magnetic layer (38), said magnetic layer having perpendicular magnetisation. The stack of layers (37) comprises an absorber layer (39), a dielectric layer (40) and a reflector layer (41), the magnetic layer (38) being located next to the reflector layer (41). The material composition and thickness of the layers making up the stack of layers (37) and the magnetic layer (38) in this second preferred embodiment are the same as described for the first embodiment.

Figure 11:
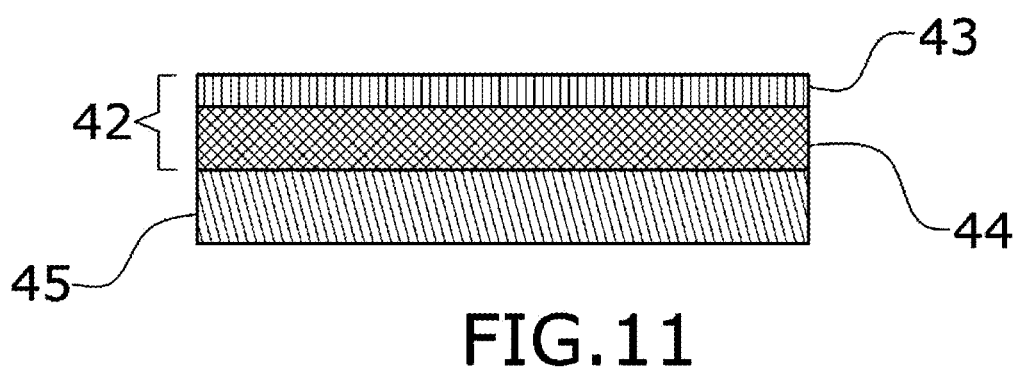
FIG. 11: Effect pigment according to a third embodiment of the invention.

With reference to FIG. 11, according to a third preferred embodiment of the invention, the effect pigment with magnetic element comprises a stack of layers (42) comprising an absorber layer (43) and a dielectric layer (44), with the same features as described above. The stack of layers (42) does not comprise a reflector layer. The magnetic element is a layer (45) made of Al2O3 containing magnetic nanoparticles. Due to the aluminium-based composition, this element also works as reflector layer. To achieve a perpendicular anisotropy, said magnetic layer (45) contains embedded nickel particles. Approximate nickel particle size is 20 nm. The thickness of the magnetic layer (45) is preferably from 10 to 2000 nm, more preferably from 20 to 1000 nm and more preferably from 50 to 150 nm.

Figure 12:
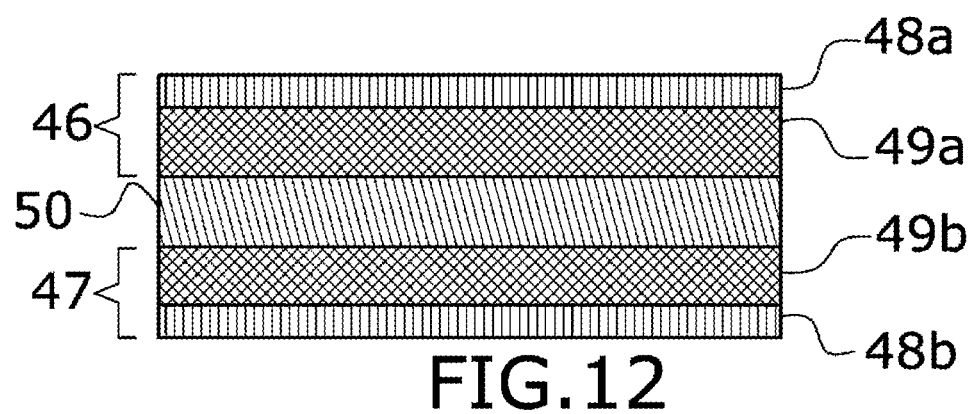
FIG. 12: Effect pigment according to a fourth embodiment of the invention.

With reference to FIG. 12, according to a fourth preferred embodiment of the invention, the effect pigment with magnetic element comprises a first stack of layers (46) and a second stack of layers (47), each of them comprising an absorber layer (48a, 48b) and a dielectric layer (49a, 49b), with the same features as described above and neither of them comprising a reflector layer. The magnetic element is a layer (50) made of Al2O3 containing magnetic nanoparticles. Due to the aluminium-based composition, this element also works as reflector layer. To achieve a perpendicular anisotropy, said magnetic layer (50) contains embedded nickel particles. Approximate nickel particle size is 20 nm. The thickness of the magnetic layer (50) is preferably from 10 to 2000 nm, more preferably from 20 to 1000 nm and more preferably from 50 to 150 nm.

Claimed pigments conforming to the described embodiments are manufactured by deposition of successive layers' materials onto a carrier substrate, according to the known technique of physical-vapor-deposition (PVD). The carrier is preferably a flexible web, e.g. a release-coated polyethylene there-phthalate (PET) foil. The vapor-deposition can be carried out as a roll-to-roll process in a high vacuum coater. The materials are evaporated using material-specific, appropriate evaporation sources and processes known to the skilled person, such as sputtering, reactive sputtering, magnetron sputtering, thermal evaporation, electron-beam, laser-beam assisted evaporation or ion-beam evaporation.

Magnetic layers (33, 38) made of CoPt alloy as incorporated to the first and second embodiments are obtained by electron beam co-evaporation, a technique that can also be employed to produce the stack (37) or stacks (31, 32) of layers. The composition of the magnetic layer (33, 38) is controlled by changing the deposition rate of Co, while deposition rate of Pt is held at 0.05 nm/sec. The base pressure of the chamber must be approximately $5 \times 10^{-9}$ Torr prior to evaporation and well below $5 \times 10^{-7}$ Torr during evaporation. According to this process, layers of $Co_{75}Pt_{25}$ deposited onto $Al_2O_3$ substrates held at temperatures from 180° C. to 400° C. exhibit a strong perpendicular magnetic anisotropy of $1.5 \times 10^7$ erg/cm3; as described in YAMADA, et al. Magnetic properties of electron beam evaporated CoPt alloy thin films. *IEEE TRANSACTIONS ON MAGNETICS.* September 1997, vol. 33, no. 5, p. 3622-3624.

Magnetic layers (33, 38) made of CoCr alloy as incorporated to the first and second embodiments are obtained by a process whereby both elements are co-deposited by RF sputtering, from a cobalt target on which a number of electrolytic chromium pellets are placed at regular intervals in a grid pattern. The composition of the layer is controlled by changing the surface area of the chromium pellets. An alloy target of CoCr can also be used for RF sputtering. The RF sputtering is carried out in an Argon gas atmosphere after baking the vacuum chamber and the substrate holder at about 300° C. The background pressure was kept under $2 \times 10^{-7}$ Torr. The thickness of the layer is controlled by the sputtering time. The deposition rate is mainly influenced by the RF power density and the Argon pressure. An acceptable deposition rate is 0.33 micron/hour, the Argon pressure is 0.01 Torr and the RF power density is 0.44 watt/cm$^2$. This process is described at IWASAKI, et al. Co-Cr recording films with perpendicular magnetic anisotropy. *IEEE TRANSACTIONS ON MAGNETICS.* September 1978, vol. MAG-14, no. 5, p. 849-851.

Magnetic layers (45) with reflector properties as incorporated to the third embodiment are obtained by sol-gel techniques described as follows in KRAUS, et al. Synthesis and magnetic properties of Ni-Al2o3 thin films. *J. appl. phys.* 1997, no. 82, p. 1189-1195.: sol-gel layers are deposited from NiAl2O4 spinel precursors derived by mixing stoichiometric quantities of solutions prepared from nickel 2-ethylhexanoate and aluminum tri-sec-butoxide in 2-methoxyethanol. The nickel solution is prepared by mixing nickel 2-ethylhexanoate with 2-methoxyethanol in a molar ratio of 1:5, refluxing at 140° C. for 12 h, centrifuging, and decanting to produce a 0.6M solution. In a separate flask, aluminum tri-sec-butoxide is dissolved in 2-methoxyethanol in a molar ratio of 1:10 and refluxed for 30 min at 140° C. The volume is reduced by distillation at a temperature of 140° C. and 200 mm Hg. Acetic acid is then added to the aluminum precursor in a molar ratio of 7:1. This solution is stirred at 120° C. until clear, and cooled to room temperature. Magnetic layers (45) are produced by spin casting a 0.4M NiAl2O4 precursor solution at 3000 rpm onto (100) Si wafers, (1102) Al2O3 electronic grade substrates, or polished fused silica plates. Layers of various thicknesses are formed by the successive application and drying of the precursor solution. As-deposited films are converted to spinel by heating at 1200° C. in air for 5 min. Once formed, the spinel is reduced to Ni+Al2O3 in hydrogen (low pO$_2$) using a Kidd Electronics rapid thermal annealed (RTA). The RTA is purged three times with 99.99% hydrogen and the reduction is carried out at 950° C. using a heating rate of 50° C./s, for 5 min in 200 cc/min flowing H$_2$.

The invention claimed is:

1. An optical effect pigment comprising a plurality of layers and a magnetic element, the plurality of layers comprising at least an absorber layer and at least a dielectric layer, a plane of the effect pigment being defined by a boundary between the absorber and dielectric layers, wherein the magnetic element has an out-of-plane magnetisation with respect to the plane of the effect pigment.

2. The optical effect pigment according to claim 1, further comprising at least two reflector layers, wherein the plurality of layers are arranged in two stacks of layers, the two stacks of layers being asymmetrical and having the magnetic element located in between them.

3. The optical effect pigment according to claim 2, further comprising a luminescent material incorporated to both stacks of layers, wherein the luminescent material incorporated to one stack of layers is different form the luminescent material incorporated to the other stack of layers.

4. The optical effect pigment according to claim 3, wherein the luminescent material is incorporated to the dielectric layers.

5. The optical effect pigment according to claim 3, wherein the luminescent material forms an additional layer on each of the stacks of layers.

6. The optical effect pigment according to claim 1, further comprising at least a reflector layer, wherein the plurality of layers are arranged in a single stack of layers and the magnetic element is located next to the at least one reflector layer.

7. The optical effect pigment according to claim 1, wherein the plurality of layers are arranged in a single stack of layers comprising at least the absorber layer the dielectric layer and wherein the magnetic element functions also as a reflector layer.

8. The optical effect pigment according to claim 1, wherein the plurality of layers are arranged in two stacks of layers, one stack of layers comprising at least the absorber layer and the dielectric layer, the other stack of layers comprising at least another absorber layer and another dielectric layer and wherein the magnetic element functions also as a reflector layer for both stacks of layers.

9. The optical effect pigment according to claim 1, wherein the magnetic element consists of one magnetic layer.

10. The optical effect pigment according to claim 1, wherein the magnetic element consists of a plurality of magnetic layers with an out-of-plane magnetisation.

11. The optical effect pigment according to claim 2, wherein the magnetic element is made from an alloy of cobalt with either platinum or chromium.

12. The optical effect pigment according to claim 1, wherein the absorber layer is selected from the group of chromium, aluminum, nickel, silver, copper, palladium, platinum, titanium, vanadium, cobalt, iron, tin, tungsten, molybdenum, rhodium and niobium and their corresponding oxides, sulphides, and carbides; carbon, graphite, silicon, germanium, cerment and ferric oxide and combinations thereof.

13. The optical effect pigment according to claim 1, wherein the dielectric layer is selected from the group of zinc sulphide, zinc oxide, zirconium oxide, titanium dioxide, diamond-like carbon, indium oxide, indium-tin-oxide, tantalum pentoxide, ceric oxide, yttrium oxide, europium oxide, iron oxides, hafnium nitride, hafnium carbide, hafnium oxide, lanthanum oxide, magnesium oxide, neodymium oxide, praseodymium oxide, samarium oxide, antimony trioxide, silicon monoxide, selenium trioxide, tin oxide, tungsten trioxide, silicon dioxide, aluminum oxide and metal fluorides and combinations thereof.

14. The optical effect pigment according to claim 2, wherein the at least two reflector layers are selected from the group of aluminum, silver, copper, gold, platinum, tin, titanium, palladium, nickel, cobalt, rhodium, niobium, chromium, iridium, and combinations thereof.

15. An ink comprising a carrier and a pigment according to claim 1.

16. The optical effect pigment according to claim 6, wherein the magnetic element is made form an alloy of cobalt with either platinum or chromium.

17. The optical effect pigment according to claim 6, wherein the reflector layer is selected from the group of aluminum, silver, copper, gold, platinum, tin, titanium, palladium, nickel, cobalt, rhodium, niobium, chromium, iridium, and combinations thereof.

* * * * *